United States Patent [19]
Sato et al.

[11] Patent Number: 5,983,038
[45] Date of Patent: Nov. 9, 1999

[54] WHITE BALANCE ADJUSTING DEVICE

[75] Inventors: Koichi Sato; Tahei Morisawa; Yasuhiro Yamamoto, all of Tokyo, Japan

[73] Assignee: Asahi Kogaku Kogyo Kabushiki Kaisha, Tokyo, Japan

[21] Appl. No.: 08/761,903

[22] Filed: Dec. 9, 1996

[30] Foreign Application Priority Data

Jan. 23, 1996 [JP] Japan ................................ 8-028496

[51] Int. Cl.$^6$ .................................................. G03B 19/00
[52] U.S. Cl. .......................................................... 396/429
[58] Field of Search .............................. 396/30, 429, 225, 396/226; 430/42, 43; 358/515, 516

[56] References Cited

U.S. PATENT DOCUMENTS

| | | | |
|---|---|---|---|
| 4,945,423 | 7/1990 | Takanashi et al. ................... | 358/300 |
| 5,132,825 | 7/1992 | Miyadera . | |
| 5,251,021 | 10/1993 | Parulski et al. ...................... | 358/500 |
| 5,315,410 | 5/1994 | Takanshi et al. ..................... | 358/471 |
| 5,424,156 | 6/1995 | Aoki et al. . | |
| 5,550,587 | 8/1996 | Miyadera . | |
| 5,555,205 | 9/1996 | Okabe ................................. | 365/108 |
| 5,568,194 | 10/1996 | Abe . | |
| 5,646,927 | 7/1997 | Shimizu et al. ..................... | 369/99 |

FOREIGN PATENT DOCUMENTS 5-2280    1/1993    Japan .

*Primary Examiner*—Safet Metjahic
*Assistant Examiner*—John Chizmar
*Attorney, Agent, or Firm*—Greenblum & Bernstein P.L.C.

[57] ABSTRACT

A white balance adjusting device includes a rotational color filter and a shutter which are provided between a photographing optical system and an electro-developing recording medium having first, second, and third recording areas. Red, green, and blue images are recorded in the first, second, and third recording areas through the rotational color filter. A photometry sensor is provided behind the electro-developing recording medium to sense the intensity of light passing through the first, second, and third recording areas. When the sensed light reaches a proper photometry value, the application of a voltage to the electro-developing recording medium is stopped, and the shutter is closed.

20 Claims, 12 Drawing Sheets

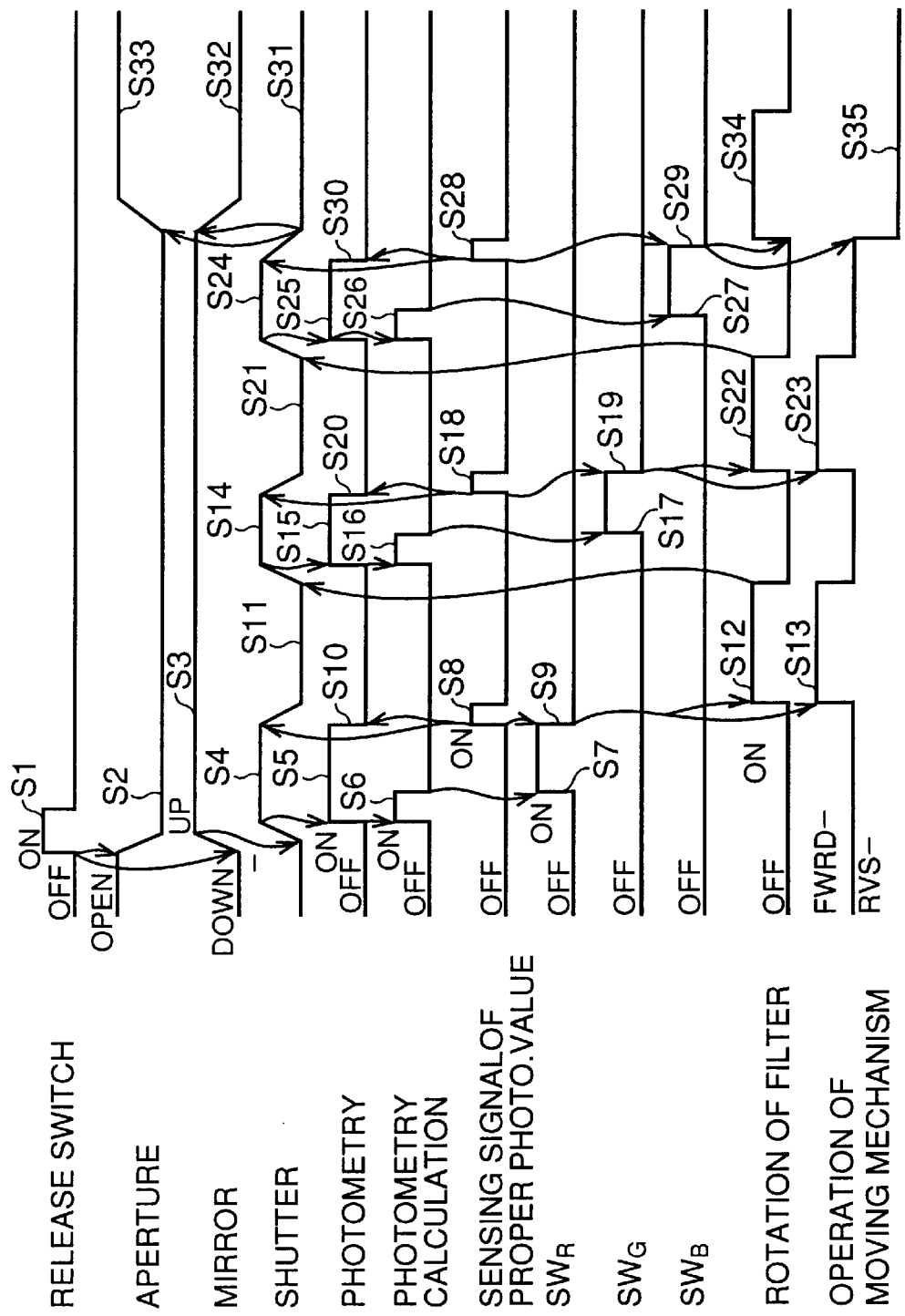

5,983,038

WHITE BALANCE ADJUSTING DEVICE

BACKGROUND OF THE INVENTION

1. Field of the Invention

The present invention relates to a camera using a recording medium in which an object image obtained through a photographing optical system is electronically developed, and more particularly, to a device for adjusting a white balance in a developing operation of the recording medium.

2. Description of the Related Art

Conventionally, as disclosed in Japanese Unexamined Patent Publication No. 5-2280 and U.S. Pat. No. 5,424,156, there is known a photographic material which is directly electronically developed so that the developed visible image can be immediately obtained. Such a recording medium will be referred to as an electro-developing recording material herein, and an electronic still camera using the electro-developing recording material is referred to as an electro-developing type camera.

If the electro-developing type camera is designed so as to take a color image, a color separation prism, for example, may be disposed in front of the electro-developing recording medium. The intensity of light of each of the color components, however, is not necessarily the same due to the characteristics of the color separation prism and the illuminating light irradiated onto the object to be photographed. Therefore, it is necessary, for example, to perform a white balance adjustment so that the intensity of light of each color component has the same value when reading the image from the electro-developing recording medium. A signal processing circuit for the white balance adjustment needs to be provided, in such a device, thus causing the electro-developing type camera to have a complex structure.

SUMMARY OF THE INVENTION

Therefore, an object of the present invention is to provide a white balance adjusting device such that an image taken by the electro-developing type camera has proper or natural colors.

According to the present invention, there is provided a white balance adjusting device mounted in an electro-developing type camera, in which an object image obtained through a photographing optical system is formed on, and electronically developed by, an electro-developing recording medium, the white balance adjusting device comprising a color separation optical system, an output processor, and a control processor.

The color separation optical system forms a plurality of predetermined color images corresponding to the object image. The output processor outputs a control signal in accordance with a transparency of the electro-developing recording medium when each of the predetermined color images is formed on the electro-developing recording medium. The control processor controls the developing operation in the electro-developing recording medium in accordance with the control signal, so that a white balance adjustment for the plurality of predetermined color images developed by the electro-developing recording medium is performed.

Further, according to the present invention, there is provided a white balance adjusting device mounted in an electro-developing type camera, in which an object image obtained through a photographing optical system is formed on, and electronically developed by, an electro-developing recording medium, the white balance adjusting device comprising a color separation optical system and a color component sensing processor.

The color separation optical system forms a plurality of predetermined color images corresponding to the object image. The plurality of predetermined color images are formed on the electro-developing recording medium. The color component sensing processor senses an intensity of light of a predetermined color component, the light of which passes through the electro-developing recording medium and the color separation optical system.

BRIEF DESCRIPTION OF THE DRAWINGS

The objects and advantages of the present invention will be better understood from the following description, with reference to the accompanying drawings in which:

FIG. 7 is a timing chart showing a photographing operation of the first embodiment;

DESCRIPTION OF THE PREFERRED EMBODIMENTS

Figure 1:
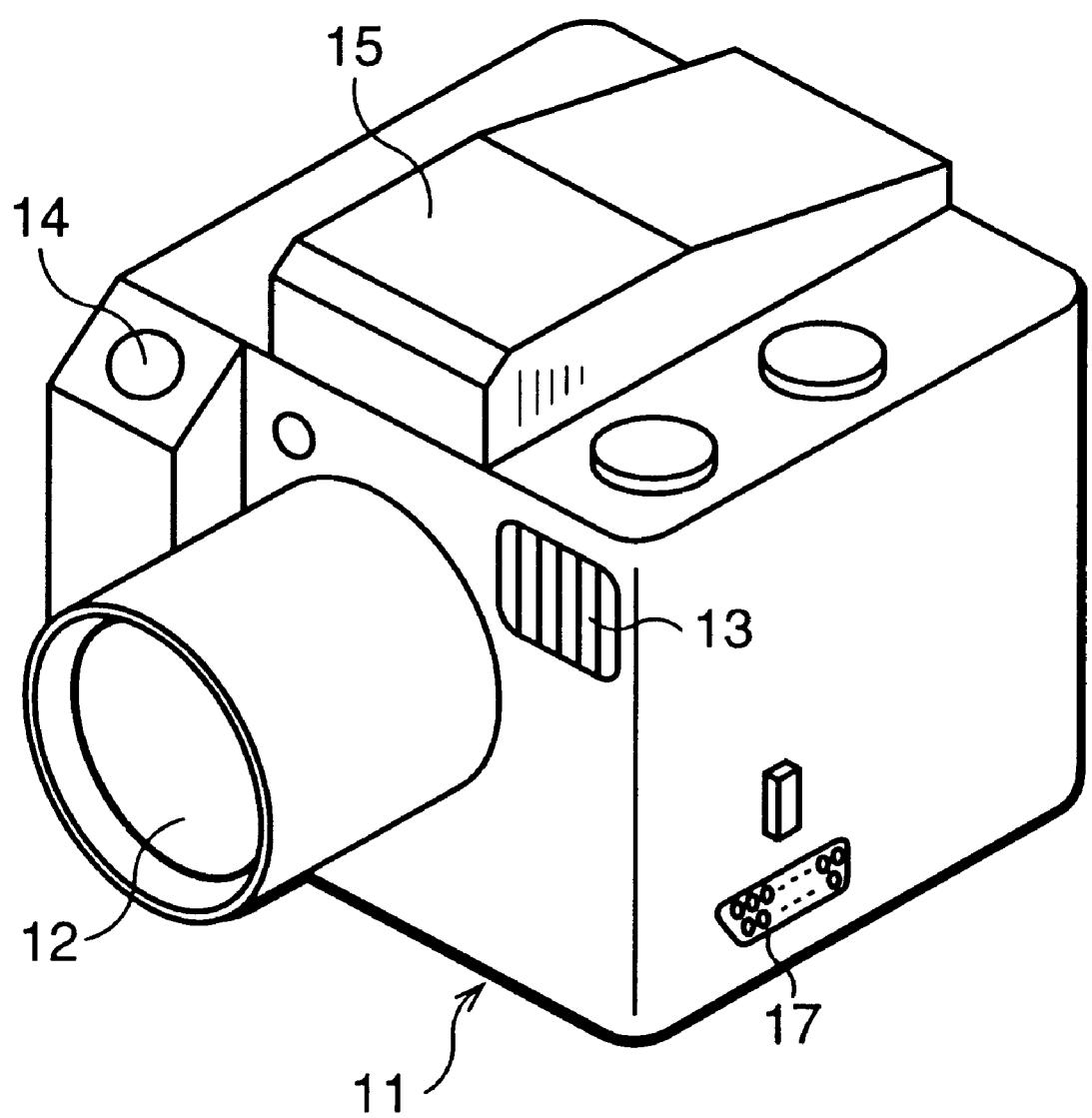
FIG. 1 is an external view showing an electro-developing type camera to which a first embodiment of the present invention is applied.

FIG. 1 is an external view of an electro-developing type camera to which a first embodiment according to the present invention is applied.

When viewing a camera body 11 from the front side, a photographing optical system 12 which includes a photographing lens system, etc. is provided approximately at a center portion of the front surface of the camera body 11, and an electronic flash 13 is disposed thereon to the right of and above the photographing optical system 12. A release switch 14 is provided on the side opposite to the electronic flash 13.

On the upper surface of the camera body 11, a view finder 15 is provided at a center portion thereof and is extended from the front end to the rear end of the camera body 11. Switches are provided on the upper surface of the camera body 11. An output terminal 17 is formed on a lower portion of a side surface of the camera body 11, so that an image signal obtained by this camera can be outputted to an external recording device.

Figure 2:
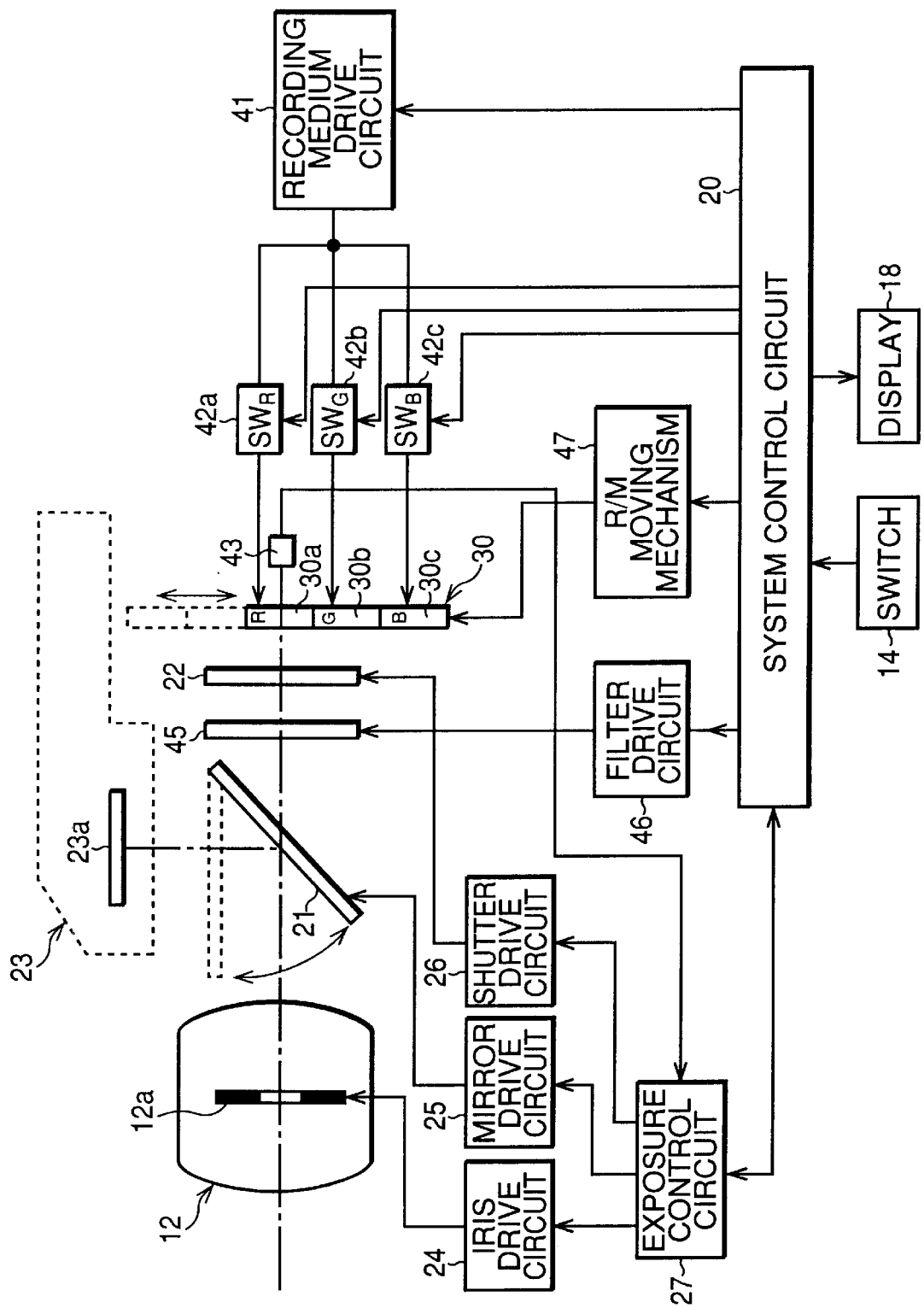
FIG. 2 is a block diagram of the electro-developing type camera of the first embodiment.

FIG. 2 is a block diagram of the electro-developing type camera, in which a system control circuit 20 including a microcomputer and a memory 20d is mounted to control the electro-developing type camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A focusing glass 23a included in a view finder optical system 23 is disposed above the quick return mirror 21. A rotational color filter 45 and a shutter 22 are provided between the quick return mirror 21 and the electro-developing recording medium 30. The shutter 22 faces the light receiving surface of the electro-developing recording medium 30. The rotational color filter 45 is disposed in front of the shutter 22.

Figure 3:
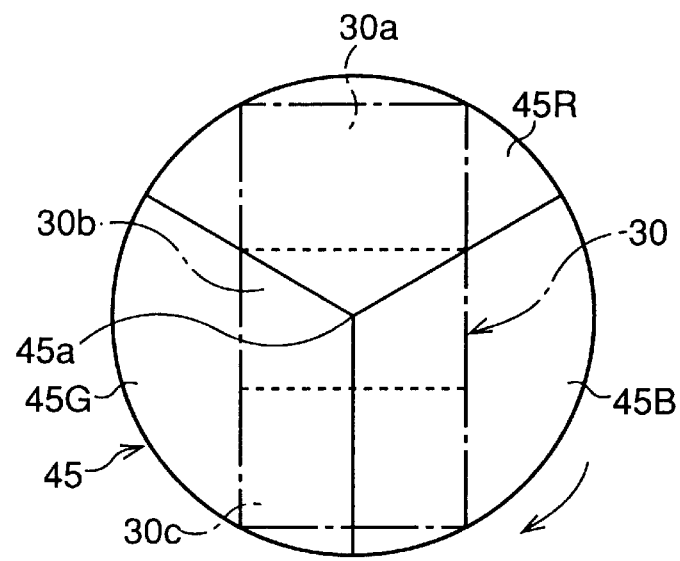
FIG. 3 is a view showing a positional relationship between a rotational color filter and an electro-developing recording medium.

FIG. 3 shows a positional relationship between the rotational color filter 45 and the electro-developing recording medium 30. The rotational color filter 45 is a color separation optical system, and has red (R), green (G), and blue (B) filter elements 45R, 45G, and 45B. The rotational color filter 45 has a disk shape, and the filter elements 45R, 45G, and 45B are defined by three straight lines which are extended radially from the rotational axis 45a of the disk to divide it into three equal parts. Namely, each of the filter elements 45R, 45G, and 45B is fan-shaped. The rotational color filter 45 is rotated around the rotational axis 45a through a rotational filter drive circuit 46 (see FIG. 2).

The electro-developing recording medium 30 has three recording areas 30a, 30b, and 30c in which red (R), green (G) and blue (B) images obtained through the rotational color filter 45 are developed, respectively, and is movable in a direction in which these recording areas 30a, 30b, and 30c are aligned. The recording areas 30a, 30b, and 30c are rectangles having the same dimensions, and are constructed in such a manner that one of the recording areas 30a, 30b, and 30c is positioned to face one of the filter elements 45R, 45G, and 45B by the operation of a recording medium moving mechanism 47 (see FIG. 2). Namely, when the shutter 22 (see FIG. 2) is opened, one of R, G, and B components is directed to the recording area 30a, 30b, or 30c which is located on the optical axis of the photographing optical system 12. Note that, in FIG. 3, the recording area 30a faces the filter element 45R.

With further reference to FIG. 2, the aperture 12a, the quick return mirror 21 and the shutter 22 are driven by an iris drive circuit 24, a mirror drive circuit 25 and a shutter drive circuit 26, respectively, all of which are controlled by an exposure control circuit 27. The exposure control circuit 27 is operated in accordance with a command signal outputted by the system control circuit 20.

Namely, during exposure, the degree of opening of the aperture 12a is adjusted by the iris drive circuit 24 under the control of the exposure control circuit 27 based on a signal outputted by a photometry sensor 28.

The quick return mirror 21 is normally set to a down position (an inclining position shown by the solid line in the drawing), so that a light beam passing through the photographing optical system 12 is directed to the view-finder optical system 23, and thus an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is directed to the electro-developing recording medium 30.

The shutter 22 is normally closed, but during a photographing operation, the shutter 22 is opened for a predetermined period by the shutter drive circuit 26 under the control of the exposure control circuit 27. Thus, the light beam passing through the photographing optical system 12 enters a light receiving surface of the electro-developing recording medium 30, to form a two-dimensional image thereon.

An electric voltage is applied to each of the recording areas 30a, 30b, and 30c of the electro-developing recording medium 30 under the control of the recording medium drive circuit 41. By exposing the electro-developing recording medium 30 while applying this voltage, R, G, and B images, which are formed by the photographing optical system 12 and the rotational color filter 45, are developed on the recording areas 30a, 30b, and 30c, as visible images. Note that a period, in which the electric voltage is applied to the electro-developing recording medium 30 is controlled through switches 42a, 42b, and 42c, which are turned ON and OFF through the recording medium drive circuit 41 in accordance with a command signal outputted by the system control circuit 20.

A release switch 14 is connected to the system control circuit 20, and a photographing operation is performed by operating the release switch 14. A display device 18 is connected to the system control circuit 20 to indicate various setting conditions of the electro-developing type camera.

Figure 4:
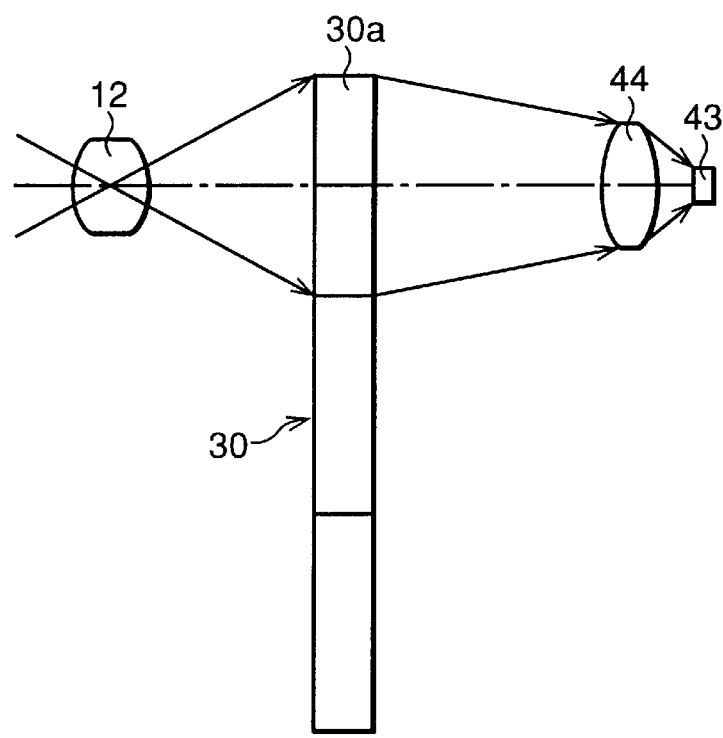
FIG. 4 is a view showing beams outputted from a photographing optical system and led onto a photometry sensor.

FIG. 4 shows beams outputted from the photographing optical system 12 onto the photometry sensor 43. As understood from this drawing, a condenser lens 44 is disposed behind the electro-developing recording medium 30. Namely, the beams are directed to the recording area 30a of the electro-developing recording medium 30 from the photographing optical system 12. The beams pass through the recording area 30a, and are concentrated on the light receiving surface of the photometry sensor 43 by the condenser lens 44. The condenser lens 44 is constructed in such a manner that light, which is outputted from the photographing optical system 12 and corresponds to a whole of the image formed on one recording area, is concentrated on the photometry sensor 43. In other words, the photometry sensor 43 senses the average value of the intensity of light passing through one recording area.

Figure 5:
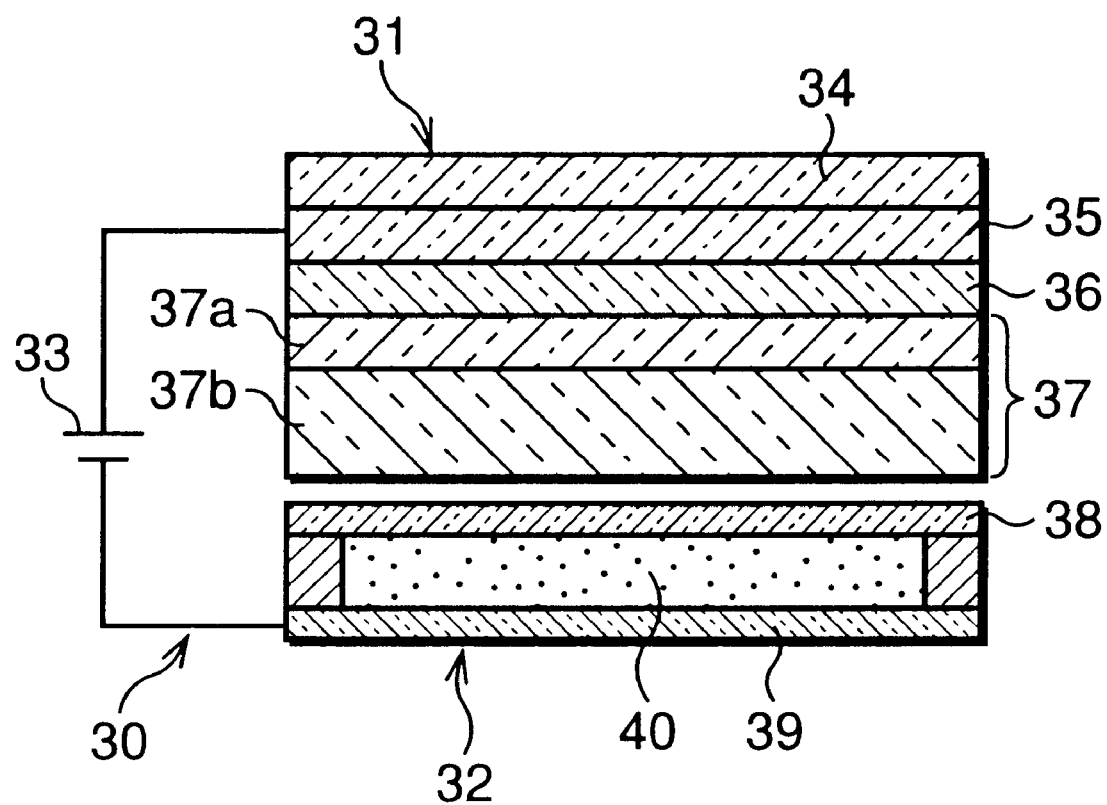
FIG. 5 is a sectional view showing a structure of the electro-developing recording medium.
Figure 6A:
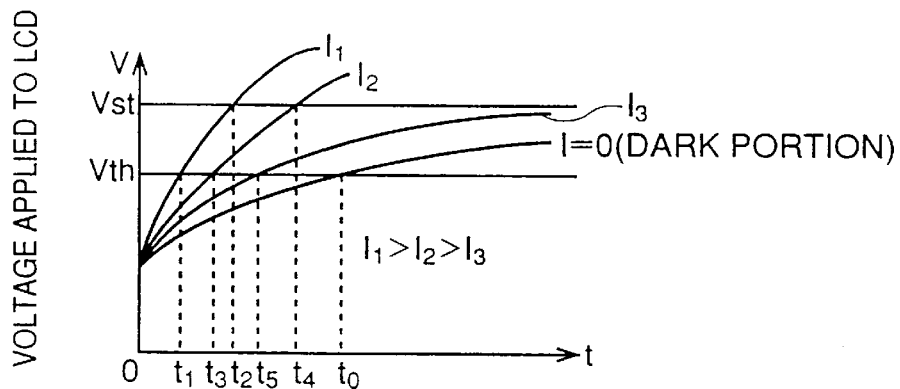
FIGS. 6A, 6B, 6C and 6D are graphs for explaining the exposure control in the electro-developing type camera.
Figure 6B:
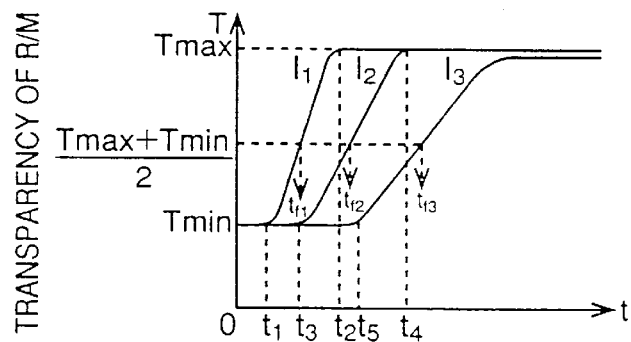
Figure 6C:
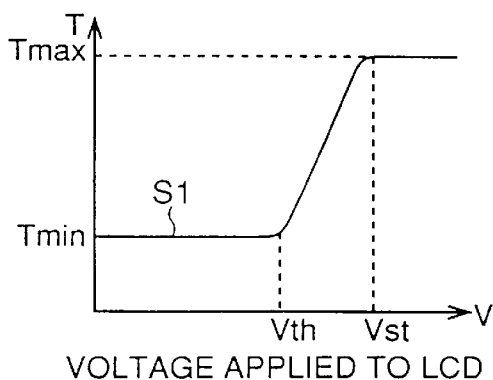
Figure 6D:
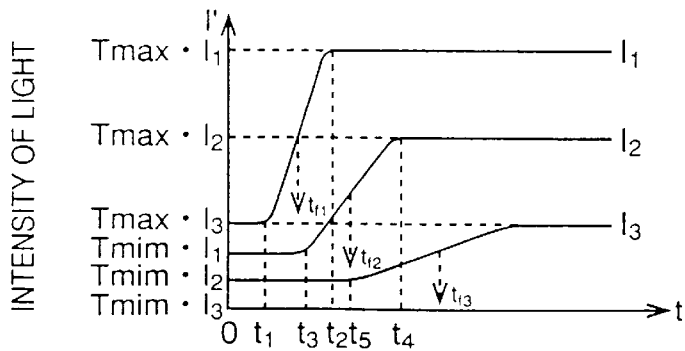

FIG. 5 shows a structure of the electro-developing recording medium 30, which is essentially the same as an electro-developing recording medium shown in Japanese Unexamined Patent Publication No. 5-2280.

The electro-developing recording medium 30 has an electrostatic information recording medium 31 and an electric charge storage medium 32. An electric voltage is applied thereto by an electric power source 33. The electric power source 33 corresponds to the recording medium drive circuit 41, so that control of the electric power source 33 (i.e., turning OFF and ON) is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining a liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an object image is developed. Namely, the visible image is generated in accordance with the electric charge.

The electric charge storage medium 32 is a liquid crystal display having a memory-type liquid crystal, and thus, the developed visible image is retained therein even if the electric field is removed. The developed visible image of the LCD can be erased by heating it, using a heating device (not shown) to a predetermined temperature. As a result, the same electric charge storage medium 32 can be used repeatedly.

FIGS. 6A–6D shows graphs outlining the exposure control in the electro-developing type camera. In these drawings, at time t=0, the shutter 22 is opened, and an electric voltage is applied to the electro-developing recording medium 30. Three lines representing the intensities of light entering the electro-developing recording medium 30 are shown, varying from a higher value of $I_1$ to a lower value of $I_3$, with the intensity of light (I=0) corresponding to the dark portion, i.e., a portion into which light does not substantially enter.

The electric voltage V applied to the liquid crystal display 40 of the electro-developing recording medium 30 is increased as the time "t" elapses, and the rate of increase becomes greater as the intensity of light entering the electro-developing recording medium 30 becomes larger.

For example, when the intensity of light is relatively large (i.e., $I_1$), the electric voltage V reaches the threshold value $V_{th}$ at time $t_1$, so that an image having a proper contrast is generated. The electric voltage V reaches the saturation value $V_{st}$ at time $t_2$. Namely, if the exposure and the voltage application are continued after time $t_2$, the portion of the liquid crystal 40 in which the intensity of light is $I_1$ becomes almost transparent, and thus the contrast of the image disappears.

When the intensity of light is $I_2$ (which is less than $I_1$), the electric voltage V reaches the threshold value $V_{th}$ at time $t_3$ (which is later than time $t_1$), and reaches the saturation value $V_{st}$ at time $t_4$ (which is later than time $t_2$).

When the intensity of light is $I_3$ (which is less than $I_2$), the electric voltage V reaches the threshold value $V_{th}$ at time $t_5$ (which is later than time $t_3$), but does not reach the saturation value $V_{st}$ even after time $t_4$.

In case of the dark portion, the electric voltage V reaches the threshold value $V_{th}$ at time $t_0$ (which is later than time $t_3$).

Considering the relationship between the change of the voltage V applied to the liquid crystal display 40 and the transparency T of the electro-developing recording medium 30, although the transparency T has the minimum value $T_{min}$ when the voltage V is lower than the threshold value $V_{th}$ as shown by the solid line S1, the transparency T increases in proportion to the voltage V when the voltage V is higher than the threshold value $V_{th}$. The transparency T reaches the maximum value $T_{max}$ when the voltage V is at the saturation value $V_{st}$.

Regarding the change of the transparency T of the electro-developing recording medium 30 with respect to time, when the intensity of light is $I_1$, the transparency T increases from the minimum value $T_{min}$ at time $t_1$, to the maximum value $T_{max}$ at time $t_2$. When the intensity of light is $I_2$, the transparency T increases from the minimum value $T_{min}$ at time $t_3$, to the maximum value $T_{max}$ at time $t_4$. When the intensity of light is $I_3$, the transparency T increases from the minimum value $T_{min}$ at time $t_5$, and does not reach the maximum value $T_{max}$ however long the period of time that may elapse. For obtaining an image having a proper contrast, the application of voltage to the electro-developing recording medium 30 should be terminated and the shutter 22 should be closed, when the transparency T of the electro-developing recording medium 30 reaches the mean value $(=(T_{max}+T_{min})/2)$ of the maximum value $T_{max}$ and $T_{min}$, for example.

In this embodiment, the intensity of light, which enters the photometry sensor 43 after passing through the electro-developing recording medium 30, is sensed, so that the operation of terminating the application of voltage and the closing operation of the shutter 22 are controlled. Namely, the photometry sensor 43 outputs a signal corresponding to the intensity of light, and the signal corresponds to the transparency T of each of the recording areas 30a, 30b, and 30c.

When the application of voltage is terminated and the shutter 22 is closed, the intensity of light entering the photometry sensor 43 is:

$$I' = I \cdot (T_{min}+T_{max})/2 \tag{1}$$

This can be transformed into as follows:

$$\begin{aligned} I' &= I \cdot T_{min} \cdot (1 + (T_{max}/T_{min}))/2 \\ &= I'(t=0) \cdot (1 + (T_{max}/T_{min}))/2 \end{aligned} \tag{2}$$

wherein $(1+(T_{max}/T_{min}))/2$ is a coefficient which is a constant determined in accordance with the characteristics of the liquid crystal 40. I'(t=0) is data sensed by the photometry sensor 43 when the shutter 22 is opened and before the application of voltage is begun.

Thus, in this embodiment, when the intensity of light I' sensed by the photometry sensor 43 reaches the proper value obtained by relationship (2), it is deemed that the transparency of the electro-developing recording medium 30 has become the mean value $(T_{max}+T_{min})/2$ of the maximum value $T_{max}$ and $T_{min}$. At this juncture, the application of power is removed and the shutter 22 is closed. In the example shown in FIGS. 6A–6D, the electric voltage of the electro-developing recording medium 30 is removed and the shutter 22 is closed at time $t_{f1}$ when the intensity of light is $I_1$, at time $t_{f2}$ when the intensity of light is $I_2$, and at time $t_{f3}$ when the intensity of light is $I_3$.

Figure 8A:
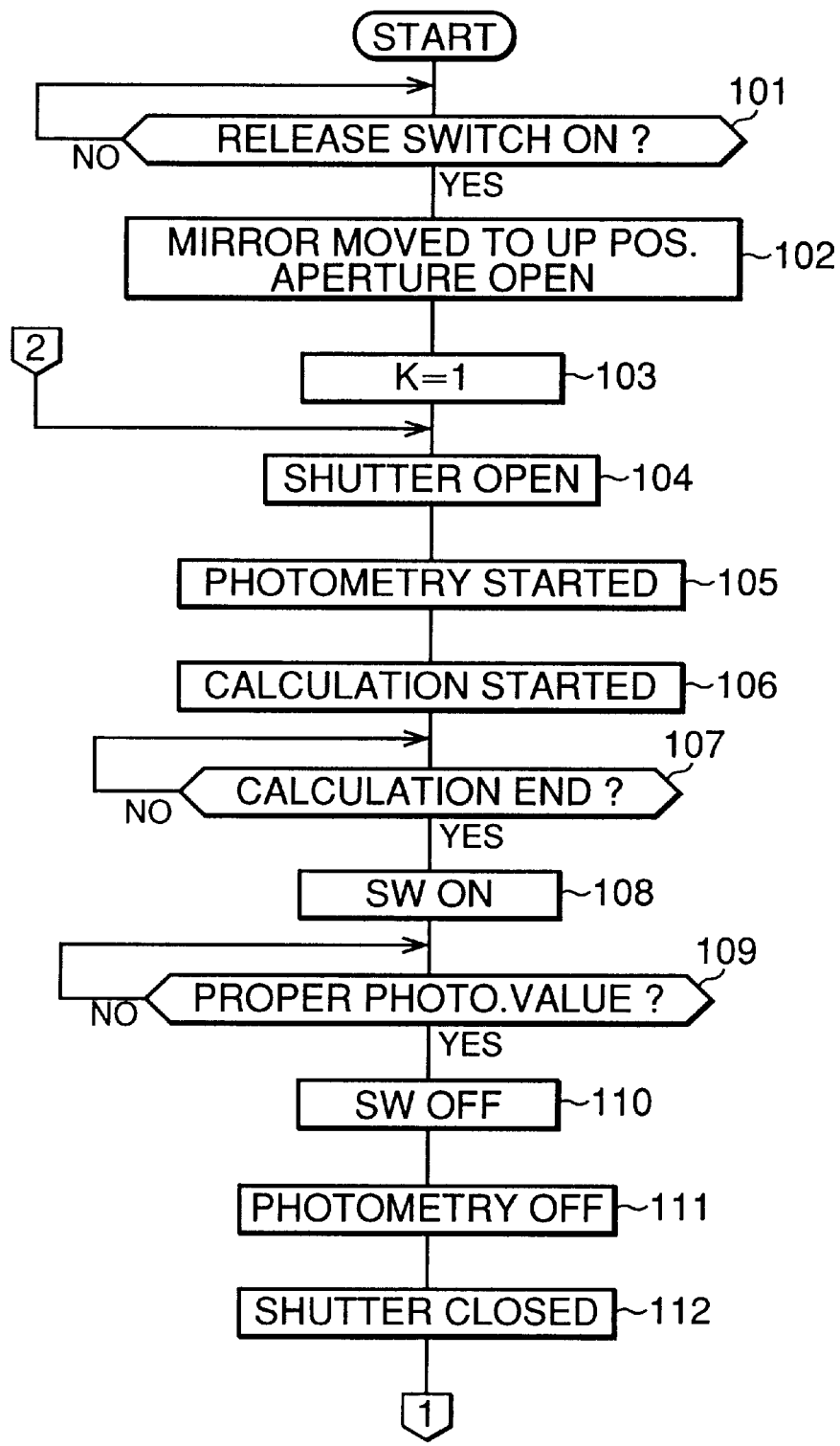
FIGS. 8A and 8B are flow charts of a program for performing the photographing operation of the first embodiment.
Figure 8B:
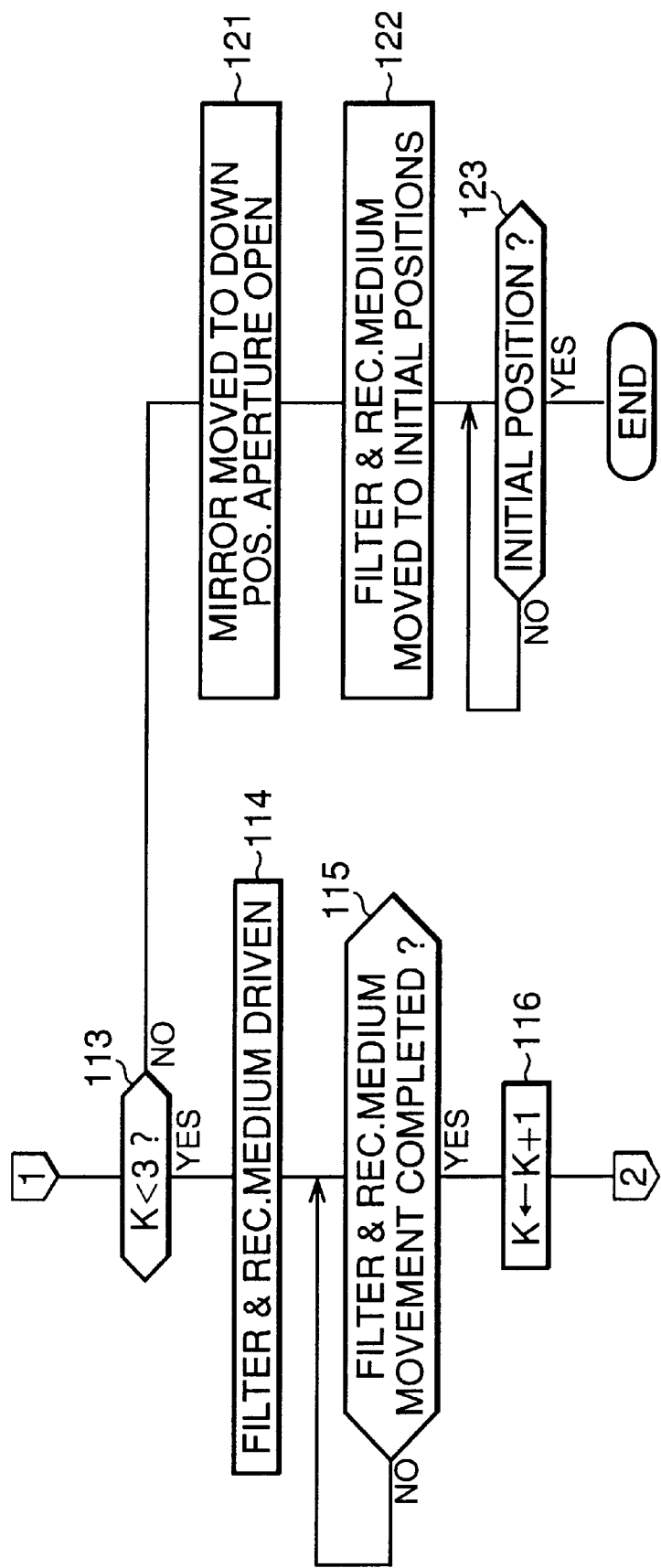

FIG. 7 is a timing chart showing a photographing operation, and FIGS. 8A and 8B are flow charts of a program for performing the photographing operation. With reference to these drawings, operations of this embodiment are described below. Note that this program is started when the power supply of the electro-developing type camera is turned ON. When the program is started, the aperture 12a is fully opened, the quick return mirror 21 is set at the down position, the shutter 22 is closed, and the rotational color filter 45 is positioned in such a manner that the first recording area 30a faces the rear surface of the R-filter element 45R. Namely, the rotational color filter 45 and the electro-developing recording medium 30 are set at the positions shown in FIG. 3.

When it is sensed in Step 101 that the release switch 14 has been depressed (reference S1), then in Step 102, the degree of opening of the aperture 12*a* is changed from the fully open state to a predetermined degree of opening (reference S2) in accordance with an aperture value set by a manual handling of the photographer, and the quick return mirror 21 is changed from the down position to the up position (reference S3). In Step 103, a counter K is set to 1. The value of the counter K corresponds to the rotational position of the rotational color filter 45. Namely, when the counter K is 1, 2, or 3, the R-filter element 45R, the G-filter element 45G, and the B-filter element 45B are positioned on the optical axis of the photographing optical system 12, respectively.

The shutter 22 is opened in Step 104 (reference S4), and a photometry by the photometry sensor 43 is started (reference S5) in Step 105. In Step 106, a photometry calculation is started (reference S6), and thus the sensed data of the photometry sensor 43 is multiplied by the coefficient of the liquid crystal 40 (FIG. 5) according to the relationship formula (2), so that a proper photometry value, which corresponds to the intensity of light sensed by the photometry sensor 43 when a proper exposure is obtained, is calculated.

When it is sensed in Step 107 that the photometry calculation has been completed, the switch 42*a* is turned ON (reference S7) in Step 108. In Step 109, it is determined whether the sensed data obtained by the photometry sensor 43 reaches a value corresponding to the proper photometry value obtained in Step 106, i.e. whether the sensed data satisfies the relationship (2). When the sensed data reaches the proper photometry value (reference S8), the switch 42*a* is turned OFF (reference S9) in Step 110. Then, in Step 111, the photometry by the photometry sensor 43 is stopped (reference S10), and in Step 112, the shutter 22 is closed (reference S11).

Then, it is determined in Step 113 whether the counter K is less than 3. When the counter K is less than 3, i.e. when the recording operations of the image for all of the recording areas 30*a*, 30*b*, and 30*c* have not yet been completed, Step 114 is executed so that the rotational color filter 45 is rotated (reference S12), the motor of the recording medium moving mechanism 47 is rotated in forward direction so that the electro-developing recording medium 30 is advanced or moved upward (reference S13). In Step 115, it is determined whether the rotation of the rotational filter 45 and the advancement of the electro-developing recording medium 30 are completed. When the rotational color filter 45 is rotated by approximately 120 degrees, so that the G-filter element 45G is positioned on the optical axis of the photographing optical system 12, and the second recording area 30*b* of the electro-developing recording medium 30 is positioned on the optical axis of the photographing optical system 12, the process goes from Step 115 to Step 116, and thus the counter K is increased by one.

Then, the process returns to Step 104, and Steps 104 through 112 are again executed. Namely, after the shutter 22 is opened (reference S14), the photometry by the photometry sensor 43 is started (reference S15), and the photometry calculation is started (reference S16) to obtain a proper photometry value. When the photometry calculation is completed, the switch 42*b* is turned ON (reference S17). Then, when the sensed data of the photometry sensor 43 becomes approximately the proper photometry value (reference S18), the switch 42*c* is turned OFF (reference S19), the photometry by the photometry sensor 43 ends (reference S20), and the shutter 22 is closed (reference S21).

Then, since it is determined in Step 113 that the counter K is less than 3, Step 114 is executed so that the rotational color filter 45 is rotated (reference S22), and the electro-developing recording medium 30 is advanced upward (reference S23). When it is confirmed in Step 115 that the rotation of the rotational filter 45 and the advancement of the electro-developing recording medium 30 are completed, i.e., when it is confirmed that the B-filter element 45B is positioned on the optical axis of the photographing optical system 12, and the third recording area 30*c* is positioned on the optical axis of the photographing optical system 12, Step 116 is executed so that the counter K is increased by one.

Then, the process returns to Step 104, and Steps 104 through 112 are again executed so that the recording operation to the third recording area 30*c* is performed. Note that the numerals included in references S24 through S31 are obtained by adding 10 to the numerals included in references S14 through S21 which show the same operations as those shown by references S24 through S31.

Thus, the R image, G image, and B image are recorded in each of the recording areas 30*a*, 30*b*, and 30*c* of the electro-developing recording medium 30.

At this point, in Step 113, since the counter K has reached 3 due to the previous execution of Step 116, the process branches to Step 121, in which the quick return mirror 21 is changed from the up position to the down position (reference S32), and the aperture 12*a* is set to the fully open condition (reference S33). In Step 122, the rotational color filter 45 is rotated (reference S34), and the electro-developing recording medium 30 is moved downward (reference S35). Specifically, the rotational color filter 45 is rotated in the same direction as in the previous operation, and the electro-developing recording medium 30 is moved in the opposite direction to that in the previous operation, so that the rotational color filter 45 and the electro-developing recording medium 30 return to their initial positions, respectively. In Step 123, it is determined whether the rotation of the rotational filter 45 and the reverse movement of the electro-developing recording medium 30 are completed. The color filter 45 is rotated by approximately 120 degrees so that the R-filter element 45R is positioned on the optical axis of the photographing optical system 12, and the first recording area 30*c* of the electro-developing recording medium 30 is positioned on the optical axis of the photographing optical system 12, and thus the color filter 45 and the electro-developing recording medium 30 return to the initial positions, respectively, and thenceforth this program ends.

As described above, in the first embodiment, the intensity of light of each of the color components entering the recording areas 30*a*, 30*b*, and 30*c* is directly sensed by the photometry sensor 43 disposed behind the electro-developing recording medium 30, and using the result of sensing, the developing operations of the recording areas 30*a*, 30*b*, and 30*c* are controlled independently each other. Therefore, according to the first embodiment, the white balance adjustment can be carried out precisely.

Figure 9:
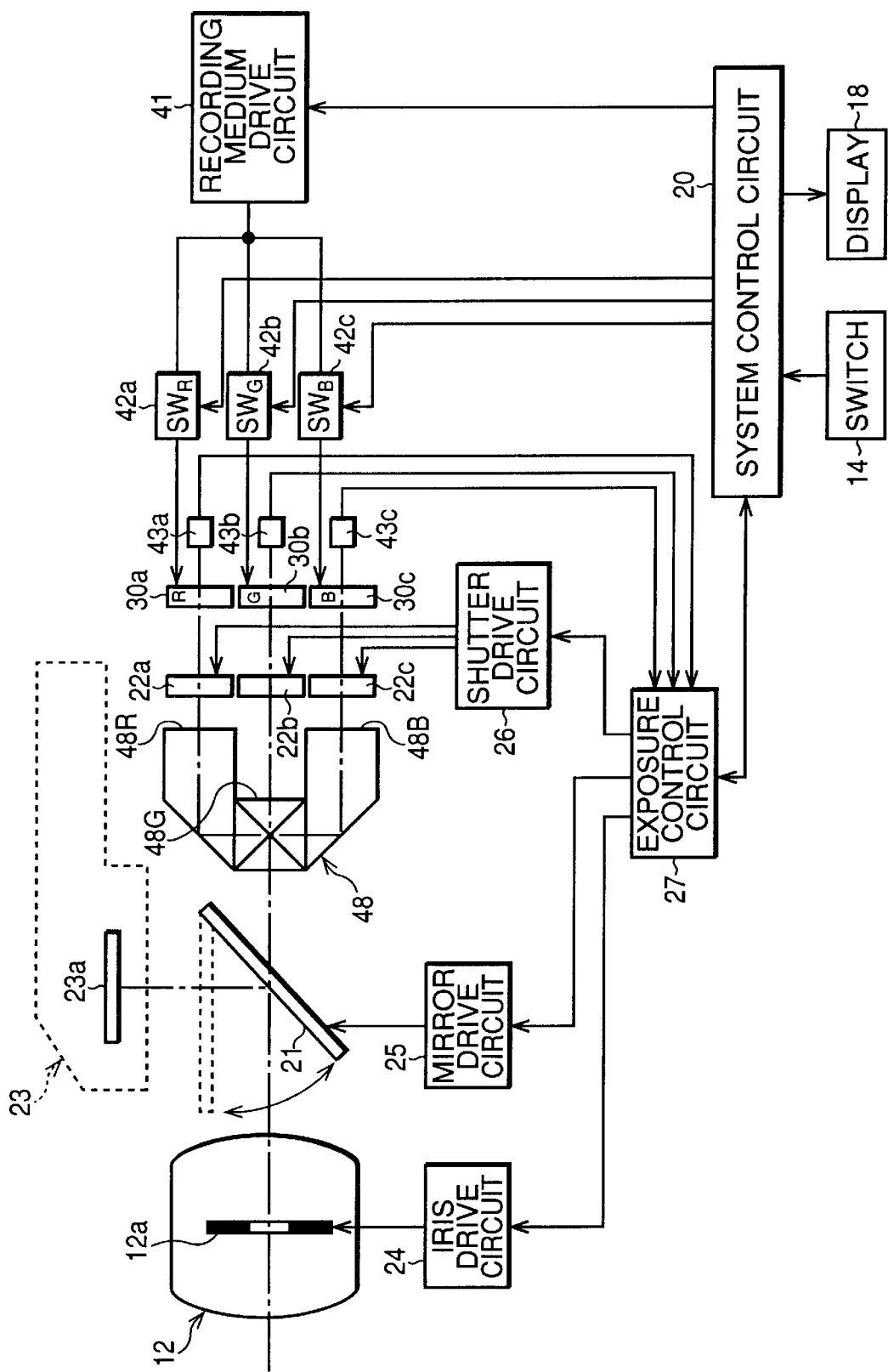
FIG. 9 is a block diagram of the electro-developing type camera to which a second embodiment of the present invention is applied.

FIG. 9 is a block diagram of the electro-developing type camera to which a second embodiment of the present invention is applied. Note that the external view of the electro-developing type camera of the second embodiment is the same as that shown in FIG. 1.

In the second embodiment, a color separation prism 48, which color-separates an object image into R, G, and B components, is provided instead of the rotational color filter 45, whose construction is different from the first embodiment. The color separation prism 48 is provided with first, second, and third emergent planes 48R, 48G, and 48B which correspond to R, G, and B images. Shutters 22a, 22b, and 22c are positioned behind the first, second, and third emergent planes 48R, 48G, and 48B, respectively. The first, second, and third recording areas 30a, 30b, and 30c of the electro-developing recording medium, are provided behind the shutter 22a, 22b, and 22c, respectively. Note that, for forming a focused image on each of the light receiving surfaces of the recording areas 30a, 30b, and 30c, a proper optical system can be disposed behind each of the emergent planes 48R, 48G, and 48B.

Photometry sensors 43a, 43b, and 43c are provided behind the recording areas 30a, 30b, and 30c, and each of the photometry sensors 43a, 43b, and 43c senses the intensity of substantially all of the light passing through each of the recording media.

Opening and closing operations of the shutters 22a, 22b, and 22c are controlled by the shutter drive circuit 26, during the application of voltage to the recording areas 30a, 30b, and 30c of the electro-developing recording medium 30 is controlled through switches 42a, 42b, and 42c. The other constructions are the same as those of the first embodiment.

Figure 10:
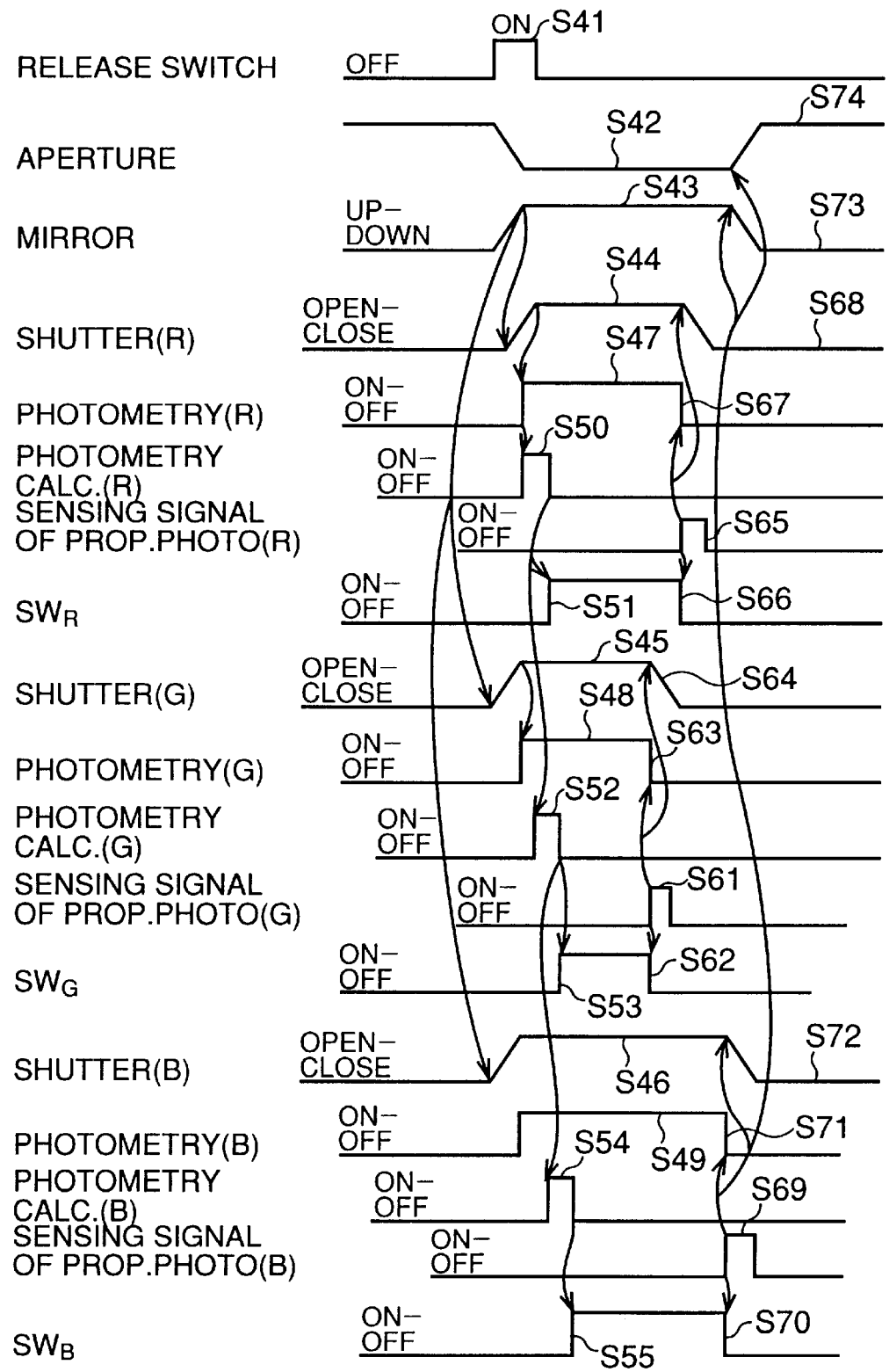
FIG. 10 is a timing chart showing a photographing operation of the second embodiment.
Figure 11A:
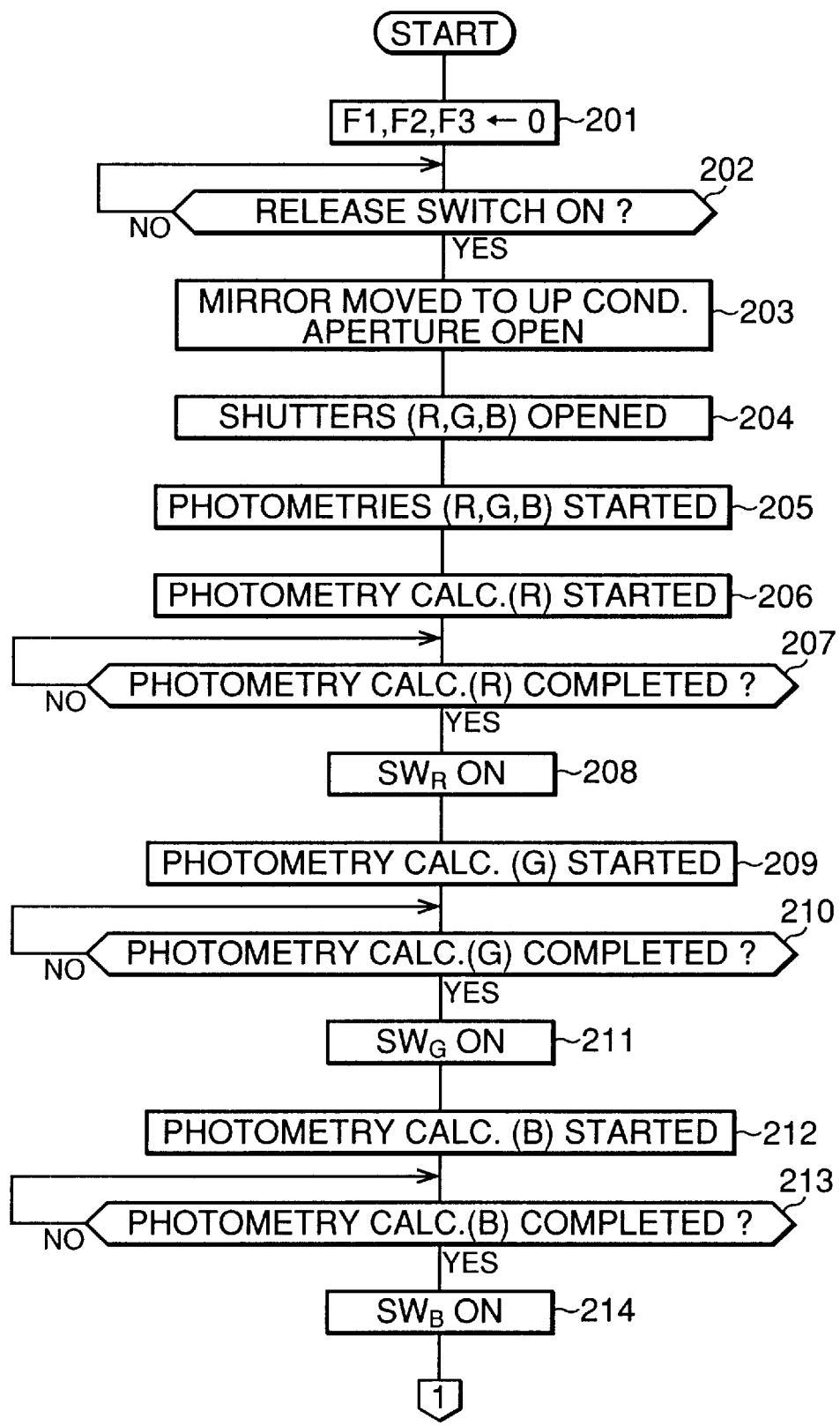
FIGS. 11A and 11B are flow charts of a program for performing the photographing operation of the second embodiment.
Figure 11B:
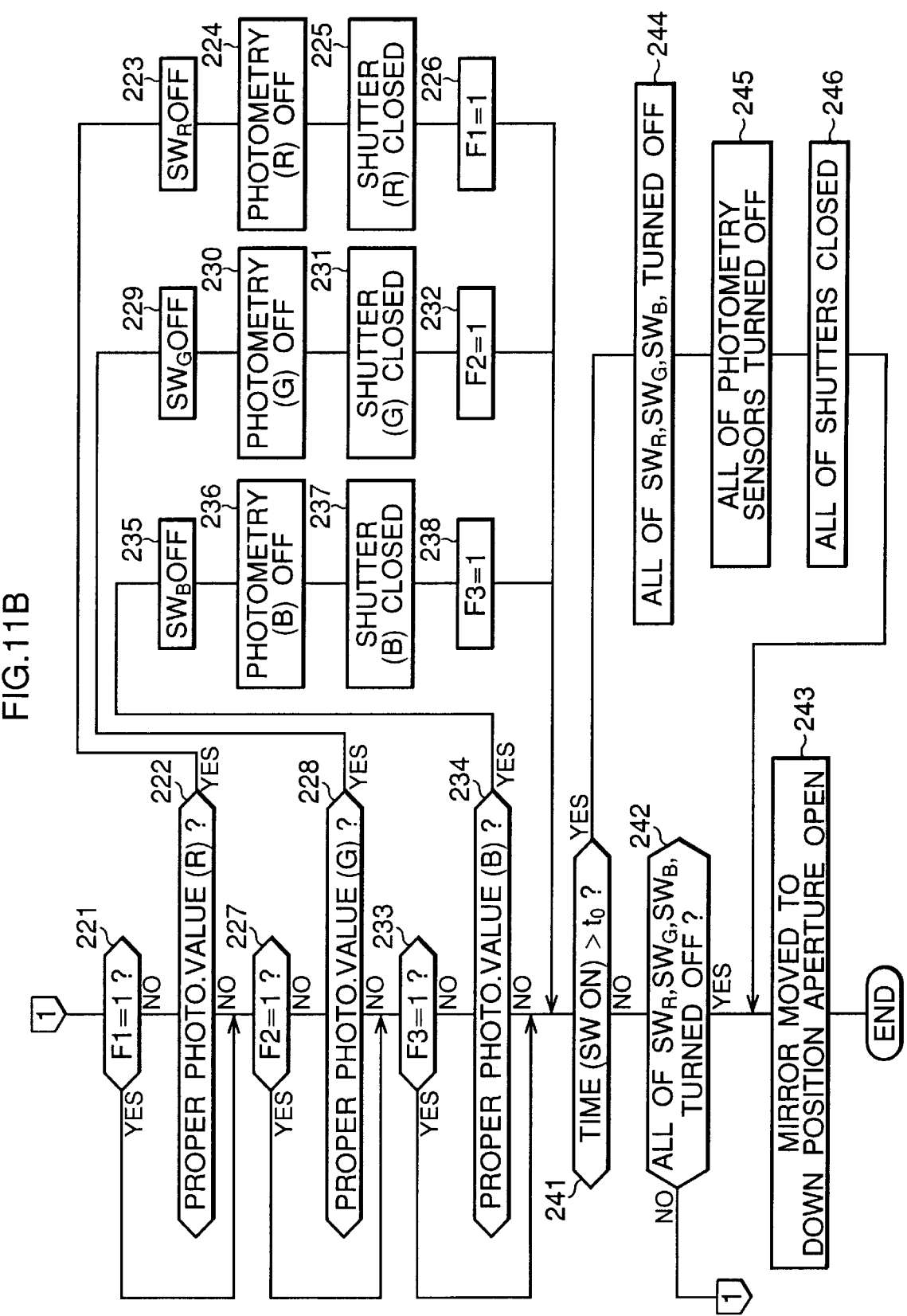

FIG. 10 is a timing chart showing a photographing operation of the second embodiment, and FIGS. 11A and 11B are flow charts of a program for performing the photographing operation. With reference to these drawings, operations of the second embodiment are described below. Note that, similar to the first embodiment, this program is started when the power supply of the electro-developing type camera is turned ON. Further, when the program is started, the aperture 12a is fully opened, the quick return mirror 21 is set at the down position, and all of the shutters 22a, 22b, and 22c are closed.

In step 201, flags F1, F2, and F3 are reset to 0, respectively. When it is sensed in Step 202 that the release switch 14 is turned ON (reference S41), the degree of opening of the aperture 12a is changed from the fully open state to a predetermined degree of opening (reference S42) in accordance with an aperture value set by a manual handling of the photographer. Simultaneously, the quick return mirror 21 is changed from the down position to the up position (reference S43).

In Step 204, the shutters 22a, 22b, and 22c are opened (references S44, S45, S46). In Step 205, photometry measurements performed by the photometry sensors 43a, 43b, and 43c are started (references S47, S48, S49).

In Step 206, a photometry calculation for an R image is started (reference S50), and thus, the intensity of light, which is sensed by the photometry sensor 43a when a proper exposure is obtained, is calculated according to the relationship (2). When it is confirmed in Step 207 that the photometry calculation has been completed, the switch 42a is turned ON (reference S51) in Step 208. Similarly, in Step 209, a photometry calculation for a G image is started (reference S52), and a data sensed by the photometry sensor 43b during a proper exposure is calculated. When it is confirmed in Step 210 that the photometry calculation has been completed, the switch 42b is turned ON (reference S53) in Step 211. In Step 212, a photometry calculation for a B image is started (reference S54), and thus, a data sensed by the photometry sensor 43c during a proper exposure is calculated. When it is confirmed in Step 213 that the photometry calculation has been completed, the switch 42c is turned ON (reference S55) in Step 214.

In Step 221, it is determined whether the flag F1 has a value of 1. This flag F1 is set to 1 in Step 226, when a recording operation (i.e., a developing operation) by the recording area 30a corresponding to the R image is completed. When Step 221 is executed for the first time, the flag F1 has a value of 0. In this case, the process branches to Step 222 in where it is determined whether the data sensed by the photometry sensor 43a has reached the proper photometry value obtained in Step 206. In the example shown in FIG. 10, the data sensed by the photometry sensor 43b, corresponding to the G image, reaches the proper photometry value before that of the R and B images. Therefore, in Step 222, it is determined that the sensed data of the photometry sensor 43a has not reached the proper photometry value. Namely, the process branches to Step 227, and it is determined whether the flag F2 has a value of 1. When Step 228 is executed for the first time, the flag F2 has a value of 0. In this case, it is determined in Step 228 whether the data sensed by the photometry sensor 43b has reached the proper photometry value obtained in Step 209, i.e. whether the sensed data satisfies relationship (2).

As an explanation, it is assumed that the data sensed by the photometry sensor 43b approximates the proper photometry value (reference S61). Namely, the process branches to Step 229, in which the switch 42b is turned OFF (reference S62). Then, the photometry by the photometry sensor 43b is stopped (reference S63) in Step 230, the shutter 22b is closed (reference S64) in Step 231, and the flag F2 is set to 1 in Step 232.

In Step 241, it is determined whether or not a time span, during which either of the switches 42a, 42b, or 42c were turned ON, was over the maximum time period $t_0$. That is, the maximum time period $t_0$ is the length of time for which an electric voltage applied to a dark portion of the liquid crystal reaches the threshold value $V_{th}$, as described above with reference to FIG. 6A. Since an over-exposure would occur even in the dark portion after the maximum time $t_0$, the photographing operation should be stopped. Conversely, when the maximum time $t_0$ has not elapsed, Step 242 is executed in which it is determined whether all of the switches 42a, 42b, and 42c have been turned OFF. Note, when Step 242 is executed for the first time, since all of the switches 42a, 42b, and 42c have not been turned OFF, the process returns to Step 221.

In Step 221, as described above, it is determined whether the flag F1 has a value of 1. In the example shown in FIG. 10, immediately after the recording operation, in which the G image is recorded in the recording area 30b is completed, the recording operation in which the R image is recorded in the recording area 30a, needs to be completed. Therefore, the process goes to Step 222 in which it is determined whether the data sensed by the photometry sensor 43a has reached the proper photometry value. When the sensed data has reached the proper photometry value (reference S65), Step 223 is executed in which the switch 42a is turned OFF (reference S66). Also, Step 224 is executed in which the photometry, by the photometry sensor 43a, is stopped (reference S67). Then, in Step 225, the shutter 22a is closed (reference S68), and in Step 226, the flag F1 is set to 1. Then, Steps 241 and 242 are executed in that order, after which the process returns to Step 221.

In the example shown in FIG. 10, the recording operations of the R and G images onto the recording areas 30a and 30b have already been completed, and the flags F1 and F2 have been set to 1, respectively. Therefore, after Steps 221 and 227 are executed in that order, it is determined in Step 233 whether the flag F3 has a value of 1. Immediately after the recording operation of the R image onto the recording area 30a is completed, the recording operation of the B image onto the recording area 30c needs to be completed. Therefore, the flag F3 has a value of 3. As a result, the process branches to Step 234, in which it is determined whether or not the data sensed by the photometry sensor 43c approximates the proper photometry value. When the sensed data by the photometry sensor 43c has approximately reached the proper photometry value (reference S69), Step 235 is executed in which the switch 42c is turned OFF (reference S70). Also, Step 236 is executed in which the photometry, by the photometry sensor 43c, is stopped (reference S71). Then, in Step 237, the shutter 22c is closed (reference S72), and in Step 238, the flag F3 is set to 1.

When it is determined in Step 241 that the maximum time $t_0$ has not elapsed, Step 242 is executed in which it is determined whether all of the switches 42a, 42b, and 42c are turned OFF. In the example shown in FIG. 10, when the recording operation of the B image onto the recording area 30c has been completed, all of the switches 42a, 42b, and 42c are turned OFF. Therefore, the process jumps from Step 242 to Step 243, so that the quick return mirror 21 is changed from the up position to the down position (reference S73), and the aperture 12a is set to the fully opened condition (reference S74). Thus, the program ends.

On the other hand, when it is determined in Step 241 that the maximum time $t_0$ has elapsed, Steps 244 through 246 are executed. Namely, in Step 244, all of the switches 242a, 242b, and 242c are turned OFF, and in Step 245, all of the photometry sensors 43a, 43b, and 43c are turned OFF. Then, in Step 246, all of the shutters 22a, 22b, and 22c are closed, and the program ends.

According to the second embodiment, similar to the first embodiment, the white balance adjustment can be carried out precisely for the image of each of the color components recorded in the recording areas 30a, 30b, and 30c. Further, according to the second embodiment, and in contrast to the first embodiment, the mechanical structure is simple, since the color separation optical system (i.e., color separation prism 48) does not need to be rotated.

Note that the electro-developing recording medium 30 is not restricted to the construction described above, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-28496, (filed on Jan. 23, 1996) which is expressly incorporated herein, by reference, in its entirety.

We claim:

1. A white balance adjusting device mounted in an electro-developing type camera, in which an object image obtained through a photographing optical system is formed on, and electronically developed by, an electro-developing recording medium, which comprises a plurality of recording areas, said white balance adjusting device comprising:

a color separation optical system forming a plurality of predetermined color images corresponding to the object image;

an output processor which receives light corresponding to an entire image formed on one of said plurality of recording areas of said electro-developing receiving medium and outputs a control signal in accordance with an intensity of the received light which varies in accordance with a transparency of said recording area of said electro-developing recording medium when each of said predetermined color images is formed on said electro-developing recording medium; and a control processor which controls a developing operation of said electro-developing recording medium in accordance with said control signal, so that a white balance adjustment for said plurality of predetermined color images developed by said electro-developing recording medium is performed.

2. A white balance adjusting device according to claim 1, each of said plurality of predetermined color images being developed in one of said plurality of recording areas.

3. A white balance adjusting device according to claim 2, wherein said control processor independently controls the developing operation of each of said plurality of recording areas, in accordance with said control signal.

4. A white balance adjusting device according to claim 1, wherein said control processor has a photometry sensor which senses an intensity of light passing through each of said plurality of recording areas.

5. A white balance adjusting device according to claim 4, wherein said photometry sensor senses the intensity of substantially all of the light passing through each of said plurality of recording areas.

6. A white balance adjusting device according to claim 1, further comprising a shutter facing said electro-developing recording medium, said shutter opening and closing in accordance with said control signal.

7. A white balance adjusting device according to claim 6, wherein said shutter closes when said transparency becomes a value which is between a maximum value and a minimum value of said transparency.

8. A white balance adjusting device according to claim 1, further comprising an electric power controlling processor which applies an electric voltage to said electro-developing recording medium, said electric power controlling processor controlling said electric voltage in accordance with said control signal.

9. A white balance adjusting device according to claim 8, wherein said electric power controlling processor stops the application of the electric voltage when said transparency has a value which is between a maximum value and a minimum value of said transparency.

10. A white balance adjusting device according to claim 1, wherein said plurality of predetermined color images are red, green, and blue images.

11. A white balance adjusting device according to claim 1, wherein said color separation optical system is provided between said photographing optical system and said electro-developing recording medium, said color separation optical system comprising a rotational color filter having red, green, and blue filter elements.

12. A white balance adjusting device according to claim 11, further comprising a moving mechanism which moves said electro-developing recording medium in such a manner that one of said recording areas faces one of said red, green, and blue filter elements.

13. A white balance adjusting device according to claim 1, wherein said color separation optical system comprises a color separation prism which separates the object image into red, green, and blue components.

14. A white balance adjusting device according to claim 1, wherein said electro-developing recording medium comprises an electrostatic information recording medium generating an electric charge in accordance with an image formed thereon, and an electric charge storage medium which generates a visible image in accordance with said electric charge and which can retain said visible image.

15. A white balance adjusting device according to claim 1, wherein said electric charge storage medium is a liquid crystal display having a memory-type liquid crystal.

16. A white balance adjusting device mounted in an electro-developing type camera, in which an object image obtained through a photographing optical system is formed on and electronically developed by an electro-developing recording medium which comprises a plurality of recording areas, said white balance adjusting device comprising:

a color separation optical system that forms a plurality of predetermined color images corresponding to the object image, said plurality of predetermined color images being formed on said electro-developing recording medium; and a color component sensing processor that receives light corresponding to an entire image formed on one of said plurality of recording areas and senses an intensity of light of a predetermined color component, said light passing through said electro-developing recording medium and said color separation optical system, said color component sensing processor outputs a signal related to the intensity of sensed light which varies in accordance with a transparency of said one of said recording areas.

17. A white balance adjusting device according to claim 16, wherein said color component sensing processor senses the intensity of substantially all of the light passing through each of said plurality of recording areas.

18. A white balance adjusting device mounted in an electro-developing type camera, in which an object image obtained through a photographing optical system is formed on, and electronically developed by, an electro-developing recording medium which comprises a plurality of recording areas, said white balance adjusting device comprising:

a color separation optical system that forms a plurality of predetermined color images corresponding to the object image;

an outputting system that receives light corresponding to an entire image formed on one of said plurality of recording areas of said electro-developing recording medium and outputs a control signal in accordance with a transparency of said one of said plurality of recording areas of said electro-developing recording medium when each of said predetermined color images is formed on said electro-developing recording medium; and a system that controls the developing operation in said electro-developing recording medium in accordance with said control signal, so that a white balance adjustment for said plurality of predetermined color images developed by said electro-developing recording medium is performed.

19. A white balance adjusting device according to claim 18, wherein said control system has a photometry sensor which senses an intensity of light passing through each of said plurality of recording areas.

20. A white balance adjusting device according to claim 19, wherein said photometry sensor senses the intensity of substantially all of the light passing through each of said plurality of recording areas.

* * * * *